Aug. 26, 1952  E. H. RUST  2,607,972
STAMPED METAL ASSEMBLY CLIP
Filed Aug. 11, 1950

INVENTOR.
EDGAR H. RUST
BY
ATTORNEY

Patented Aug. 26, 1952

2,607,972

UNITED STATES PATENT OFFICE 2,607,972

STAMPED METAL ASSEMBLY CLIP

Edgar H. Rust, Denver, Colo.

Application August 11, 1950, Serial No. 178,813

1 Claim. (Cl. 24—85)

This invention relates to what may be termed a model house kit, and has for its principal object the provision of inexpensive, easily used materials which will enable the user to assemble any desired house plan to scale in three dimensions so as to enable prospective builders and the like to better envision the final house.

Another object of the invention is to provide a simple, economical, and highly efficient metal clip which can be used for supporting the walls and partitions of the model house in their proper positions, and for attaching said walls and partitions to floor and ceiling members.

A further object is to so construct the kit materials that it will be unnecessary to use a rule in order to construct the model to an accurate scale.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Basically, the improved kit consists of three separate types of parts, that is, a floor board 10, elongated wall and partition members 11, and assembly clips 12.

The floor board 10 is preferably formed from a soft, pressed, flat material such as "Celotex" or the like. The upper surface of the board is imprinted with crossed lines 13 having any desired uniform spacing. It is preferred to space the lines at intervals of one-fourth inch so that the final plan will be on a scale of one-fourth inch equals one foot, corresponding to the scale of the usual house plan.

The wall and partition members 11 are imprinted with vertical lines 14 spaced apart to correspond to the scale and spacing of the lines 13. In the original kit the partition members 11 have a length substantially equal to the length of the floor board 10. In assembling them into the final plan, they are cut along the lines 14 to the desired length for the given wall or partition. It is unnecessary to measure their length, since the lines 14 may be counted to determine the desired length.

The lines 14 may be scored or indented into the board 11, as indicated at 15, so that the partition members could be broken along selected score lines to produce any given scale length.

Figure 3:
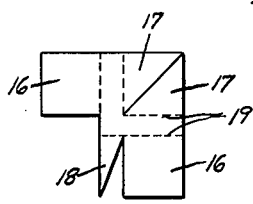
Fig. 3 illustrates a blank of sheet metal to be used in forming an improved assembly clip for use with the model house kit.
Figure 4:
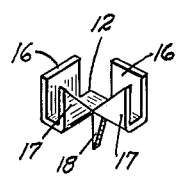
Fig. 4 illustrates the assembly clip formed from the blank of Fig. 3.

The clip 12 is preferably formed from a blank of light sheet metal stamped out as shown in Fig. 3 to produce two rectangular flaps 16, two triangular flaps 17, and a sharpened point 18. The blank is folded along fold lines, such as indicated in broken line at 19, to produce the completed clip of Fig. 4. When folded, the rectangular flaps 16 and the triangular flaps 17 project upwardly in parallel spaced relation, and the sharpened point 18 projects downwardly therefrom.

Figure 1:
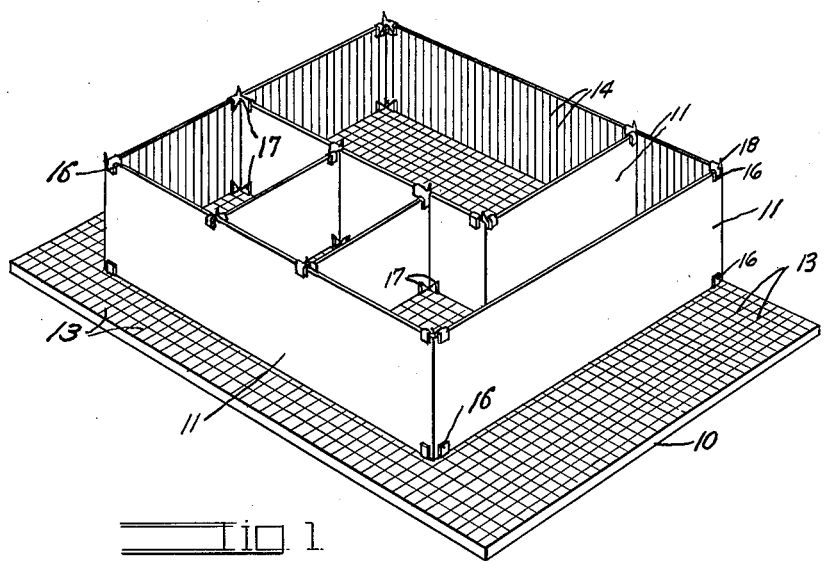
Fig. 1 is a perspective view illustrating the improved model house kit as it would appear when assembled to produce a typical house plan.
Figure 2:
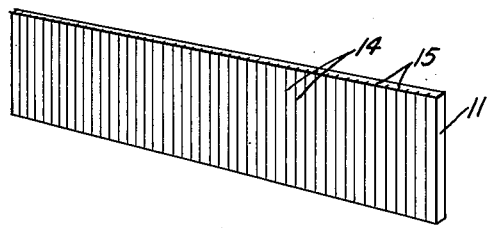
Fig. 2 is a perspective view of one of the wall and partition members employed in constructing the model house of Fig. 1.

In constructing the model house, the corner points of the outside walls are located by counting off the lines 13, and the clips 12 are mounted at these corner points by forcing the sharpened point 18 into the floor board 10. The various partition and wall members are then cut or broken to length and slipped into the clips 12 between the flaps 16 and 17 so as to be supported at their extremities in vertical position. The various intersecting walls and partitions are then connected at their tops by means of additional clips 12, as shown in Fig. 1.

A ceiling board can then be forced downwardly on the upwardly projecting points 18, if desired, and the plan of the second floor can then be similarly laid out on the upper surface of the ceiling board. The points 18 could be eliminated from the clips employed at the tops of the partitions, if desired.

The final result is a complete house plan laid out in three dimensions. Lithographed or printed pieces representing doors, windows, wall paper, and other accessories can be glued or otherwise secured on the members 11 if a more complete picture is desired.

The improved kit is not only valuable for demonstrating house plans, but also serves as a toy for children or as an instruction device for teaching house and building layouts.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

An assembly clip for assembling and supporting wall members from a floor board in model house construction, comprising: an L-shaped blank of sheet metal having two leg portions intersecting each other at a right angle to form an outside corner and an inside corner; a square projection in the inside corner lying in the plane of said blank, there being a split extending diagonally inward from said outside corner to said inside corner and terminating at said square projection; and a pointed prong projecting from one side of said square projection, the rectangular terminal extremities of said legs being bent upwardly at right angles to said blank on bend lines at right angles to each other and aligning with the outside edges of said square projection, the corner extremities of said legs being similarly bent upward at right angles to said blank on bend lines intersecting each other at the terminus of said split, the latter bend line in each leg aligning with the inside edge of the opposite leg, said prong being bent downwardly at right angles to the plane of said blank.

EDGAR H. RUST.

REFERENCES CITED

The following references are of record in the file of this patent:

UNITED STATES PATENTS

| Number | Name | Date |
|---|---|---|
| Re. 22,481 | Kaye | May 16, 1941 |
| 477,829 | Wells | June 28, 1892 |
| 1,620,737 | Peterson | Mar. 15, 1927 |
| 1,845,240 | Cook | Feb. 16, 1932 |
| 1,974,819 | Koerner | Sept. 25, 1934 |
| 2,101,378 | Wiskoff | Dec. 7, 1937 |
| 2,127,047 | Penney | Aug. 16, 1938 |
| 2,168,911 | Meyer | Aug. 8, 1939 |
| 2,214,988 | Bolhms | Sept. 17, 1940 |
| 2,221,766 | Harris et al. | Nov. 19, 1940 |
| 2,284,458 | Van Antwerp | May 26, 1942 |
| 2,317,124 | Adams | Apr. 20, 1943 |
| 2,491,597 | Adams | Dec. 20, 1949 |